United States Patent [19]

Oman

[11] 4,072,827
[45] Feb. 7, 1978

[54] TELEPHONE PATCHING APPARATUS

[76] Inventor: Robert C. Oman, 120 Pierce St., #4, San Francisco, Calif. 94117

[21] Appl. No.: 765,174

[22] Filed: Feb. 3, 1977

Related U.S. Application Data

[63] Continuation-in-part of Ser. No. 723,385, Sept. 15, 1976, abandoned.

[51] Int. Cl.[2] .............................................. H04M 5/04
[52] U.S. Cl. .................................. 179/42; 179/7.1 R; 179/18 AB; 179/18 BD
[58] Field of Search .............. 179/7 R, 7.1 R, 7.1 TP, 179/8 R, 8 A, 1 C, 1 MN, 1 PC, 2 C, 18 AD, 18 AB, 16 EC, 18 BE, 18 BD, 18 F, 27 CA, 27 F, 42, 91

[56] References Cited

U.S. PATENT DOCUMENTS

| 3,397,288 | 8/1968 | Semon | 179/42 |
|---|---|---|---|
| 3,542,969 | 11/1970 | Fields | 179/42 |
| 3,769,463 | 10/1973 | Graham et al. | 179/7.1 TP |
| 3,849,605 | 11/1974 | Russell | 179/18 AB |
| 3,959,600 | 5/1976 | Sousa | 179/18 BE |
| 3,965,306 | 6/1976 | Watkins | 179/18 BE |
| 3,982,073 | 9/1976 | Baltzer et al. | 179/7.1 TP |

Primary Examiner—William C. Cooper
Assistant Examiner—Gerald L. Brigance

[57] ABSTRACT

For use in telephone answering service installations, a circuit device is disclosed for bridging or patching external calls, such as an incoming call to a dialed-out call, and for timing the duration of (actual time usage of) the interconnection. The device is adapted for providing a coupling between a pair of the telephone front cord plugs of a conventional PBX switchboard. Circuitry is provided for sensing the mechanical connection of a jack to a plug and for sensing electrically the completion of the telephone call connection, for inductively coupling incoming and outgoing calls, for automatically disconnecting the inductive coupling upon sensing termination of a call connection and for timing, displaying and at least temporarily storing the duration of the call interconnection for entering a time charge to the customer's account. In the preferred embodiment, light emitting diodes (LEDs) coupled in series with the telephone lines are operative to trigger a photosensitive logic switch optically isolated from the phone lines, which switch operates logic control circuitry. The logic control circuitry initiates and terminates call timing circuitry and controls relay switching circuitry for automatically disconnecting the bridged telephone lines only upon the actual interruption of a call connection. The disclosed circuit is relatively immune to transients which would otherwise cause call interruption. Further, the call timing circuitry includes provision for automatic display of an initial billing unit and for selection of the duration of the base billing unit of each subscribing customer.

8 Claims, 3 Drawing Figures

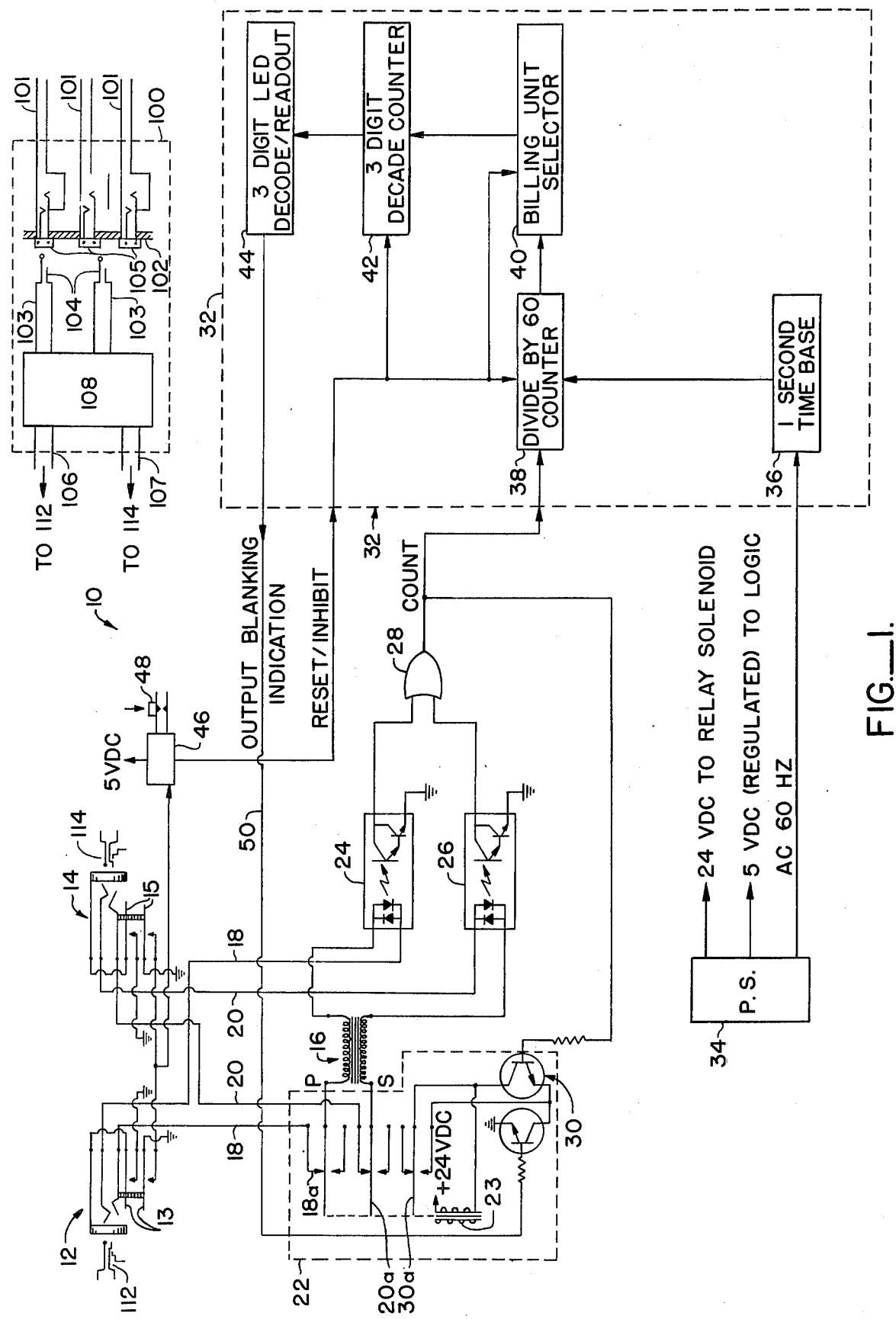
FIG._1.

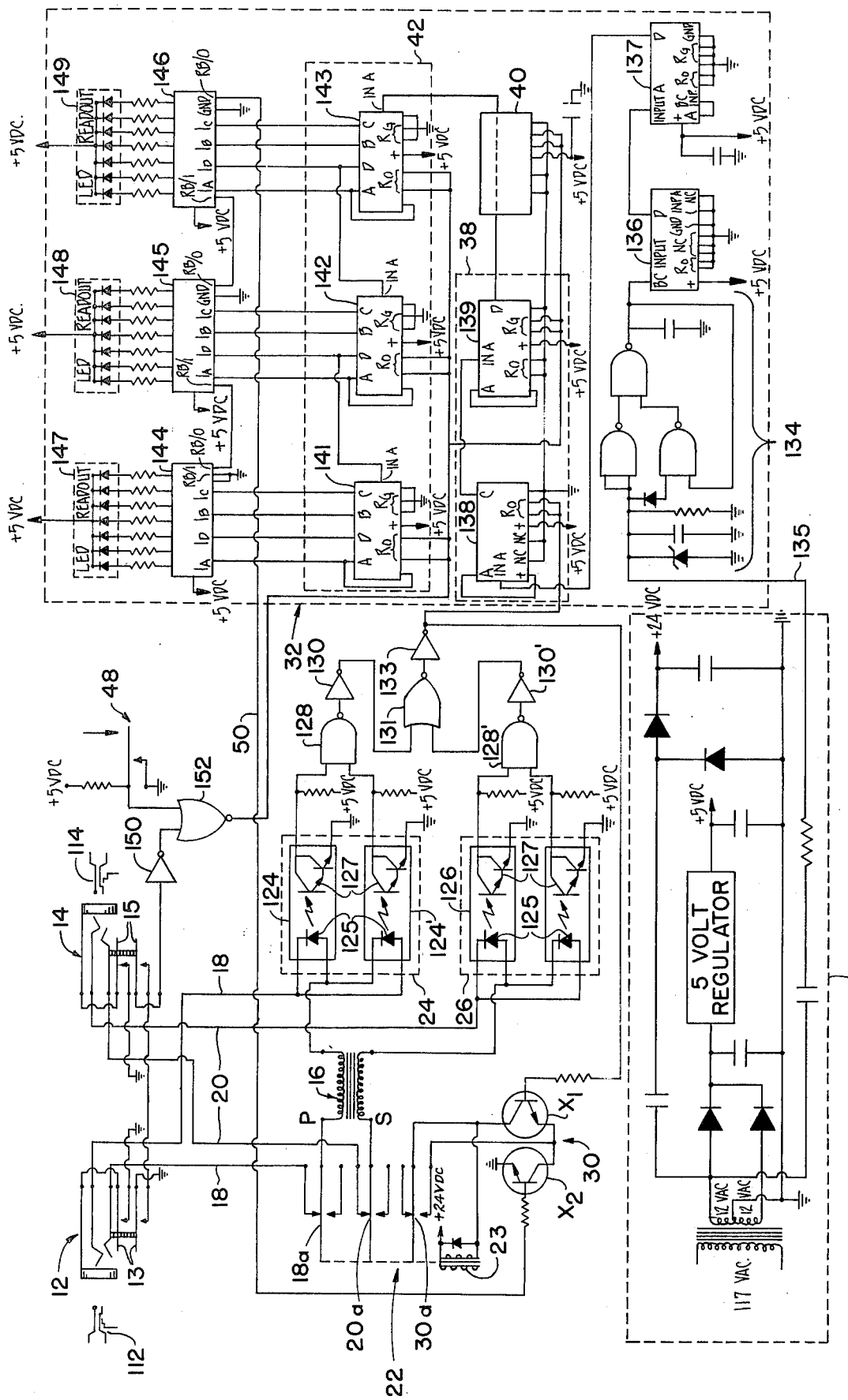
FIG._2.

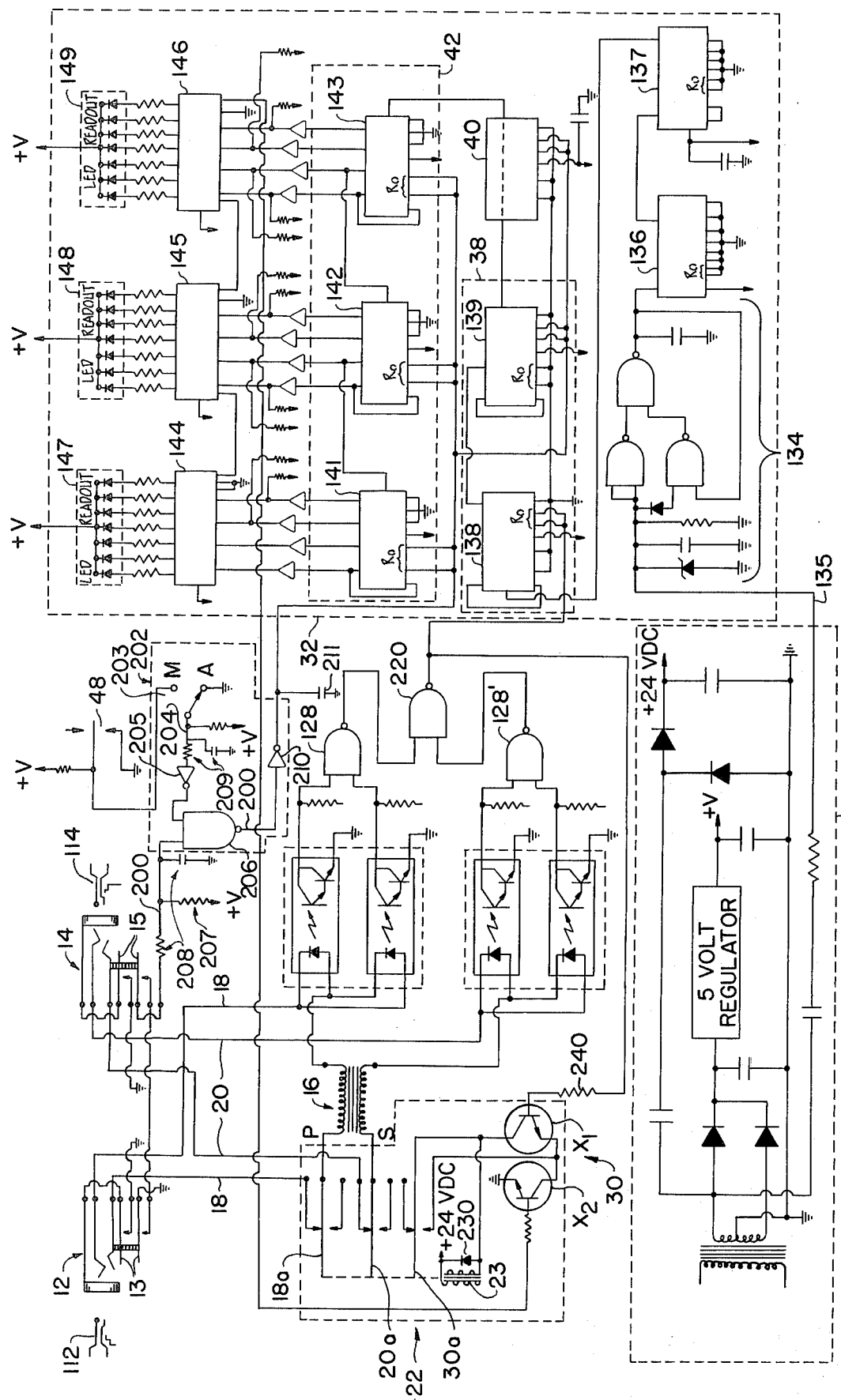
FIG._3.

TELEPHONE PATCHING APPARATUS

BACKGROUND OF THE INVENTION

This application is a continuation-in-part of application Ser. No. 723,385 filed Sept. 15, 1976, now abandoned.

1. Field of Invention

This invention relates to telephone equipment for the use of telephone answering services, and it relates specifically to a system for bridging or patching external telephone calls at a switchboard and for automatically timing the duration of the call interconnection of a subscribing customer.

In a telephone answering service, an operator is provided with a central exchange switchboard for receiving calls directed to a customer, whereby messages may be taken or the incoming call bridged or patched to a telephone line at which the subscribing customer can be reached.

In many cases, charges for such calls are assessed on a billing unit basis determined by the number of calls and duration of such calls. The charges are generally manually recorded or logged by an operator monitoring the call patch at the conclusion of the telephone call.

In recent years, data processing equipment has been developed for automatically charging and billing customers. Although such equipment can perform many of the routine charging and billing operations with speed and accuracy, the cost of such facilities is too high for use in telephone answering service applications, where volume and switching facilities do not justify fully automatic equipment.

A connection between external calls, e.g., an incoming call and an outgoing call, at a central telephone answering switchboard, known as "patching", is ordinarily provided by jumper cables on the switchboard. In the conventional switchboard it is essential that the jumper cable be removed after parties have completed their conversation; otherwise telephone lines remain tied up. Also, the answering service operator must frequently tap the patched line in order to determine whether conversation is still taking place. This procedure is very time consuming and may result in inadvertent disconnection of the customer's conversation, as for example when one of the parties is temporarily on HOLD at the moment the operator taps the line. Moreover, billing of the client may be incorrect where timing is determined by the duration of the patch connection, rather than the actual duration of the call.

2. Description of the Prior Art

Various monitor control units have been developed whereby two calls may be patched through a telephone answering service. One such system is disclosed in U.S. Pat. No. 3,113,185 to Semon. The described device includes relay coils hooked in series with the telephone line which signals the apparent termination of the telephone conversation. Call termination is determined by a change sensed in the voltages which result when either party on the patched transmission line hangs up. Such couplings are generally unacceptable to the telephone company because the coupling is insufficiently isolated from telephone line equipment to satisfy telephone company interconnection standards. Moreover, such patching devices may also cause inadvertent interruption of the patched transmission line as a result of line noise, sudden signal changes caused by loud sounds at the handsets, or other interference in the telephone circuit.

SUMMARY OF THE INVENTION

The present invention comprises a circuit device for use in telephone answering service installations, for bridging or patching external calls such as an incoming call to a dialed-out call, and for timing the duration of actual time usage of the interconnection. The device provides a coupling between a pair of the front cord plugs of a conventional telephone PBX switchboard. The system includes circuitry for sensing the mechanical connection of a jack to a plug and for sensing electrically the completion of the telephone call connection, for inductively coupling or bridging incoming and outgoing calls, for automatically disconnecting the inductive coupling upon sensing termination of a call connection and for timing, displaying and at least temporarily storing the duration of the call interconnection so that a time charge may be entered to the customer's account.

In the preferred embodiment, light emitting diodes (LEDs) coupled in series with the telephone lines are operative to trigger a photosensitive logic switch optically isolated from the phone lines, which switch operates logic control circuitry. The logic control circuitry initiates and terminates call timing circuitry and controls relay switching circuitry for automatically disconnecting the bridged telephone lines only upon the actual interruption of a call connection. The disclosed circuit is relatively immune to transients which would otherwise cause call interruption. Further, the call timing circuitry includes automatic display of an initial billing unit, and circuitry for selecting the duration of the base billing unit of each subscribing customer.

It is a primary object of the present invention to provide a device for patching telephone calls through a telephone switchboard which couples the calling parties and automatically interrupts the connection only upon the termination of either call.

It is a further object of the invention to provide means for automatically timing and computing the number of units for a call fed through the device.

It is a further object of the invention to provide means for selecting the base billing unit according to customer's preference.

It is yet another object of the invention to provide means whereby a patch connection through the device between telephone lines cannot be effected during the display and prior to the clearing of previously tallied billing units.

It is still a further specific object of the invention to provide sensors for telephone lines which are substantially immune to false interruption signals.

DESCRIPTION OF THE DRAWINGS

FIG. 1 is a block diagram in partial schematic form showing the preferred embodiment of the invention; and FIG. 2 is a schematic block diagram of the preferred embodiment of the invention.

FIG. 3 is a schematic block diagram of a further embodiment of the invention.

DETAILED DESCRIPTION OF PREFERRED EMBODIMENTS

Referring now to the drawings, FIG. 1 illustrates a call patching device 10 with a call timing feature in partial block diagram form. The patching device 10 is particularly useful with a conventional PBX switchboard 100 such as the Type 557 switchboard manufactured by Western Electric Company. The conventional switchboard 100 includes external call lines 101 coupled to a patch board 102 and front cords 103 which couple plugs 104 to jacks 105 in the patchboard 102. The front cords 103 couple to back cords 106 and 107 and phone plugs 112 and 114 through switchboard control circuitry 108, which includes panel control indicators and operational elements, such as the "operator tel" relay (not shown).

The patching device 10 according to the present invention is operative to receive phone plugs 112 and 114 and telephone signals over the back cords 106 and 107.

The patching device 10 includes first and second phone jacks 12 and 14 with contact sets 13 and 15, a coupling transformer 16, signal lines 18 and 20, a reset 22 with contact sets 18a, 20a and 30a, first and second signal sensors 24 and 26, sensor logic circuitry 28, reset relay latch controller 30 and a digital timer 32. In addition a power supply 34 furnishing D.C. voltage to operate relay 22, regulated D.C. voltage to operate digital circuitry and a relatively stable source of 60 Hertz A.C. voltage for use as a timing reference.

The jacks 12 and 14 couple phone plugs 112 and 114 to signal lines 18 and 20 through jack contact sets 13 and 15. Signal lines 18 and 20 are inductively coupled through normally closed contact sets 18a and 20a through the primary (P) and secondary (S) of transformer 16. First and second sensors 24 and 26 are series connected in signal lines 18 and 20 respectively in order to independently sense whether the individual signal lines 18 and 20 are in use. The binary signal output of sensors 24 and 26 are coupled to sensor logic 28, the output of which is coupled to latch controller 30 and timer 32.

The timer 32 includes a 1-second time base 36 derived from the 60 Hz A.C. signal of power supply 34, a divide-by-60 circuit 38, billing unit selecting circuitry 40, a three-digit decade counter 42, and a visual display output 44.

There is further included manual reset logic circuitry 46, coupled between contact sets 13 and 15 which is operative to timer 32, the connection of telephone lines to jacks 12 and 14 to provide a patch inhibiting signal through the timer 32 via line 50 to the latch controller 30 or a reset signal to the timer 30 upon actuation of a momentary contact switch depending upon the condition of display 44.

Briefly, the operation of the circuitry of FIG. 1 is as follows: To initiate a bridge or patch between phone lines, phone plugs as 112 and 114 from back cords 106 and 107 correspond-to the two phone lines to be patched, are inserted in the jacks 12 and 14 to effect closure of contacts 13 and 15 respectively, and the presence of plugs in the jacks 12 or 14 is sensed at reset logic circuitry 46. Phone signals are applied by signal lines 18 and 20 through normally closed contacts of relay 22 and through the transformer 16 which inductively couples calls on signal lines 18 and 20. A completed call is signaled by a change in D.C. voltage level on the line. The signal sensors 24 and 26 which may be optical couplers employing LEDs, sense this change in the voltage on the lines 18 and 20 and give a signal indication of a connected call.

In particular, optically isolated detectors in sensors 24 and 26 first provide a signal to logic circuitry 28, herein represented as a dual input OR gate. An output at ground potential from the sensors 24 and 26, indicating that the LEDs are conducting, signals a completed call. Ground potential outputs at both inputs of logic circuitry 28 together produce a logical LOW to initiate the clock function of timer 32 and to inhibit the operation of latch controller 30 to prevent activiation of the solenoid of reset relay 22.

During an interval following the first connection of the plugs 112 and 114 to the jacks 12 and 14, assuming that the display 44 is clear, the signal line 50 is at a low or near ground voltage level.

Latch controller 30 is responsive so as to maintain reset relay 22 in the normally closed, non-energized state, even though the sensor logic circuitry might temporarily reverse state due to bounce at contact set 13 and 15 or switching level voltage transients on the internal phone lines.

Timing of the telephone conversation can be initiated by a signal from logic circuitry 28 only after reset logic circuitry 46 has cleared any previously accumulated count. The 60 Hz signal from power supply 34 provides a time base which is converted to a basic one second interval output pulse of time base 36, which in turn is divided to a one minute output pulse time base in counter 38. A 1 minute interval is herein used as the basic telephone system billing unit. The output of counter 38 is provided to billing unit selector 40, which establishes a customer charge unit tailored to the billing arrangement of the individual customer. The output of selector 40 is tallied in decade counter 42 which in turn is visually reproduced at display output 44.

The billing unit selector 40 circuitry may, for example supply an output count each minute or in any selective multiple of the basic billing unit to decade counter 42. For this purpose, selector circuitry 40 may be constructed on a removable circuit card wired according to the specification of the minimum charge unit for the selected customer. This also provides a convenient means for keeping track of telephone company unit charges to the answering service in order to bill the customer for actual time usage of the respective line.

A particular feature of the invention is the immunity of the device 10 to inadvertent disconnection of the patched lines 106 and 107. Whereas spurious line noise or large excursions in signal level might cause other types of sensors, such as an inductive sensor, to erroneously effect disconnection, the optical sensors 24 and 26 of the present invention are operative to disconnect only upon at least momentary voltage interruption in either of the patched lines 106 and 107. In fact, this characteristic is employed to operate the sensor logic 28 to cause the automatic disconnection of the patched lines at the normal termination of either external telephone connection. When either connected party on the telephone lines 106 and 107 terminates the telephone line connection, a voltage change occurs on either signal line 18 and 20. The loss of line voltage is detected by either signal sensor 24 or signal sensor 26, either of which activates logic circuitry 28 to produce a logical HIGH signal to inhibit further accumulation of billing units in counter 38 and to activate latching relay 22, disconnecting both telephone line connections through the respective relay contact sets 18 and 20.

Display 44, since it is illuminated by the output of billing unit numerals, provides a signal via line 50 to relay controller 30, which is responsive to latch the energized reset relay 22 through power provided at latch contacts 30a. The display 44 persists until a reset signal is provided through momentary contact switch 48, which is typically a simply push button. This permits the operator to disengage the plugs and log billing units in due course without the requirement that the plugs be removed immediately. Since the reset logic circuitry 46 is also sensitive to the presence of plugs and jacks 12 and 14, the reset relay 22 cannot be de-energized until at least one or alternatively both phone plugs are removed from the jacks 12 and 14. Therefore, customer charges are not inadvertently lost by premature activation of the switch 48.

In order to illustrate particular features of the invention, references are made to FIG. 2. In FIG. 2, sensors 24 and 26 each comprise a pair of optical couplers 124, 124' and 126, 126' including LEDs 125 coupled in antiparallel pairs in each of the signal lines 18 and 20. Outputs of photodetectors 127 of each of the optical couplers 124, 124', 126, 126' are connected according to the signal lines source to a pair of dual input NAND gates 128, 128', the outputs of which are inverted by inverters 130 and 130', provided to a dual input NOR gate 13 and fed through an inverter 133 to latch controller 30 and timer 32.

The latch controller 30 comprises a pair of NNP power transistors $X_1$ and $X_2$, the first of which ($X_1$) having its base coupled to the output of inverter 133, its collector coupled to the DC power source for the relay 22 solenoid, and its emitter coupled to the collector of transistor $X_2$. The collector of transistor $X_2$ is also coupled through relay contacts of relay 22 to the power source of relay solenoid coil 23. The relay contacts 30a are normally open when the relay 22 is not energized. The emitter of $X_2$ is coupled to ground, while the base is coupled via output blanking line 50 to display 44.

The timer 32 includes, as time base 36, a pulse shaping network 134, which accepts a sinusoidal AC input via line 135 from power supply 34 and provides a square wave output to series coupled dividers 136 and 137. Divider 136 may be a type SN7492, or its equivalent, operative as a divide-by-six counter, and divider 137 may be a type SN7490, or its equivalent, decade counter. The counters type SN7490 and SN7492, as well as all integrated circuits (IC) bearing the prefix "SN" are manufactured by Texas Instruments of Dallas, Tex. Various IC manufacturers supply pin-for-pin equivalent circuits.

The output designated D of counter 137 is provided to an input designated IN A of a divide-by-6 counter 138 which forms the front end of the divide-by-6 counter 138. Counter 138 may also be a type SN7492 IC. The control signal input to timer 32 is provided to the $R_0$ input of counter 138. Output C of counter 138 is coupled to the input designated IN A of a decade counter 139, which may be a type SN7490 in suitable configuration. Output D thereof is provided to billing unit selector 40.

The billing unit selector 40 comprises connections across a removable IC socket or selected IC circuits insertable into the socket on a patch card which is removable from the telephone patching device circuitry. The particular configuration of the billing unit selector 40 is established according to the billing arrangement of the subscribing customer. In its simplest configuration, selector 40 is merely a strap across input pins and output pins of an IC socket otherwise wired to receive a type SN7490 counter. In other embodiments, the billing unit selector may incorporate an IC such as the types SN7490, SN7492 or SN7493 configured for the selected billing unit multiple (2, 3, 4, 8, 10, 12, 16, etc) of the basic 1 minute billing unit.

The billing unit selector 40 provides a signal count pulse to the three digit decade counter 42. Decade counter 42 may comprise three type SN7490 counter circuits 141, 142, 143 coupled in parallel and wired for BCD output. Each of the counter circuits 141–143 may drive a decode/drive circuit 144, 145, 146, such as type SN7447 decoder/driver, which in turn may each drive seven segment LED numerical displays 147, 148, 149. The RB/O terminal of decode/drive circuit 146 signals output blanking via line 50 to the base of transistor $X_2$.

Reset circuit 46 comprises an inverter 150, a dual input NOR gate 152, and momentary contact switch 48. The input of inverter 150 is taken from series connected relay contacts 15 and 13 of jacks 14 and 12. Inverter 150 input is provided with a logical LOW signal only upon insertion of both phone plugs 112 and 114 in jacks 12 and 14. The output of inverter 150 is provided to one input of NOR gate 152, the other input being normally held to a logical HIGH by a bias voltage. Switch 48 is operative upon activation to provide a logical LOW to the HIGH biased input of NOR gate 152.

The output of NOR gate 152 is provided to circuit elements 139, 141, 142, 143 and 40 and indirectly to circuit element 138. The NOR gate 152 output is received at the respective circuit elements 138–143 and 40 to effect a reset to ZERO in counters 138, 141, 142 and a reset to all nines in circuit elements 139 and 40. As a consequence, initiation of timing at divide-by-6 counter 138 first causes a display at the end of an initial 6-second interval upon the cycling of the first output count of counter 138 through counter 139 and unit 40, which are set to all nines, into decade counter 143 and driver 146.

FIG. 3 illustrates a further specific embodiment of the invention which operates in much the same manner as the embodiment of FIG. 2. In the embodiment of FIG. 3, the series connected relay contacts 13 and 15 of jacks 12 and 14 respectively are coupled via signal line 200 to a selector means 202 which selects between an automatic mode and a manual mode.

The selector means 202 comprises a selector switch 203 which in a first position is coupled to normally open and voltage energized push-button switch 48 and in a second position, is coupled to ground. A mode signal line 204 is coupled through switch 203 to an inverter 205, the output of which is coupled to one input of a dual input NAND gate 206. Signal line 200 is coupled to the other input of NAND gate 206. Signal line 200 is tied to the high state voltage through a moderate sized load resistor 207. RC low pass filters 208, 209, comprising a small series resistor and a large shunt capacitor, are placed at both NAND gate 206 inputs for stability. An invertor 210 is coupled between the output of NAND gate 206 and the $R_0$ inputs of counters 141, 142, and 143. A stabilizing capacitor 211 is shunt coupled at the inverter 210 output.

In addition, outputs of NAND gates 128 and 128' are coupled to the input terminals of a dual input NAND gate 220. A diode 230 may be shunted across solenoid 23 to protect transistors $X_1$ and $X_2$. A series resistor 240 is provided between the output of NAND gate 220 and the base input of transistor $X_1$. NAND gate 220 output is also coupled to the $R_0$ inputs of counter 138.

A light test for the LED readouts 147, 148, and 149 may be provided through a tap 242 to push button switch 48. Grounding of the switch 48 draws current through all LED lamps in order to check for malfunction.

To promote further operational stability buffers 244 with corresponding pull-up resistors 246 may also be provided between counters 141, 142 and 143 and drivers 144, 145, and 146.

Having thus set forth in detail the particular elements of the invention with the essential interconnection and function, the operation of the circuit according to the invention can now be understood.

1. Initiating a Patch

Upon insertion of plugs 112 and 114 corresponding to the two telephone lines to be patched into jacks 12 and 14, three operations take place. First, ground is applied to the sleeve connection of jacks 12 and 14, to automatically activate an "operator tel" relay (not shown) in the switchboard 100 (FIG. 1). This causes direct connection of switchboard circuitry 108 from the trunk or front cord 103 to the patch or back cord 106, 107. Second, ground is applied through inverter 150 to NOR gate 152, which inhibits reset of counters 141, 142, and 143. And third, signals on line 18 and 20 are applied through the normally closed contacts or relay 22 and through coupling transformer 16. Signals on lines 18 and 20 are also coupled through the diodes 125, to activate the sensors 24 and 26 in a manner which drives the outputs thereof to a logical LOW.

Depending upon line polarity, there will be a logical LOW applied from optical couplers 127 to at least one of the inputs of each of the NAND gates 128 and 128'. In the circuit of FIG. 2, a logical HIGH from NAND gates 128 and 128' is inverted to a logical LOW by inverters 130 and 130', which in turn provide inputs to NOR gate 131. The presence of logical LOWs at both inputs of NOR gate 131 produces a logical HIGH at the input of inverter 133, which inverts the same to a logical LOW. The logical LOW from inverter 133 initiates the time function of timer 132 and locks latch controller 30 in the OFF state. In the circuit of FIG. 3, a logical HIGH from NAND gates 128 and 128' is provided directly to the NAND gate 220. The presence of a logical HIGH at both inputs of NAND gate 220 produces a logical LOW initiating the time function of timer 32 and locking latch controller 30 in the OFF state. The filter capacitor 230 smooths the output to suppress undesirable transients.

2. Patch in Progress

Sinusoidal current from power supply 34 is provided via line 135 to the drive pulse shaping circuit 134, which in turn supplies a 60 Hz square wave pulse train to divide-by-6 counter 136, which supplies 10 pulses per second to decade counter 137, which in turn provides one pulse per second as a time base to divide-by-6 counter 138.

Counter 138 times out 6 seconds before a signal is provided to decade counter 139, which has been preset to all nines. At carry, a single billing unit is coupled through the counting circuitry to driver 146 to automatically display a single billing unit in the LED readout 149. This initiates a signal on output blanking indication line 50, causing current to flow through the base of transistor $X_2$. The HIGH signal on line 50 prevents premature activation of relay 22 due to contact bounce and the like during the initial 6 second interval.

In continued operation, one second pulses are accumulated through ICs 138 and 139 to provide one pulse per minute at the billing unit selector 40. Where direct strapping is provided across selector 40, timing pulses or one pulse per minute are passed onto the decade counter 42, first cycling through units counter 143, then the tens counter 142, then hundred counter 141, accumulating the billing units in the display 44.

BCD information from the three digit decade counter 42 is decoded by the BCD-to-7 segment decoders 144–146, which provide the signals indicating numeric count of billing units through display readouts 147–149.

3. Patch Disconnect and System Reset

Loss of line voltage in either signal line 18 or 20 caused by termination of either telephone connection into the patch board after the initial six second is detected by sensors 24 or 26 and operate to disconnect the patched lines. A logical HIGH is provided at one of the inputs of NAND gates 128 or 128' which in turn produces a logical HIGH at the output of inverter 133 in the circuit of FIG. 2. In the circuit of FIG. 3, the functional equivalent occurs at the output of NAND gate 220. The logical HIGH produces current flow through transistor $X_1$ activating reset relay 22, which is then held energized by contacts 30a coupling the solenoid voltage to the collectors of both transistors $X_1$ and $X_2$. This latching condition can exist only if a patch has been consummated, as indicated by current flow at the base of transistor $X_2$, which has been produced by an indication of display provided through decoder driver 146 via line 50.

The activation of reset relay 22 disconnects phone line circuits through transformer 16 and also causes the switchboard 100 to disconnect associated phone lines of the front cord, which in turn activates switchboard supervision lamps (not shown). The supervision lamps signal to the operator that the telephone conversation has been terminated.

The logical HIGH signal from inverter 133 also signals count termination in timer 32. The final tally of accummulated billing unit is displayed on the numerals of the readout 147–149.

In the circuit of FIG. 2, reconnection and subsequent use of the phone lines is inhibited until push button 48 is activated to produce a logical LOW signal at the input of NOR gate 152. With at least one of the phone plugs (112 and 114) removed from a jack (12 or 14), NOR gate 152 is permitted to change state, which clears three digit decade counter 42 and extinguishes numerical display.

In the circuit of FIG. 3, reconnection and subsequent use of the phone lines is inhibited until the removal of one or more of the phone plugs 112 or 114 from one of the jacks 12 or 14. Reset is accomplished automatically upon removal of one of the phone plugs 112 or 114.

Having thus explained the operation of the invention, many other embodiments will be apparent to those of ordinary skill in the art. Therefore, it is not intended that this invention be limited, except as indicated by the appended claims.

I claim:

1. Apparatus for coupling external calls through a telephone switchboard comprising:
   first and second signal lines;
   jack means for connecting a phone plug to each of said signal lines;
   transformer means for inductively coupling said first and second signal lines:
   switching means in each of said signal lines for making and breaking the signal path through said lines;

call sensing means for independently detecting continuity in each of said signal lines and for providing a binary signal indicating, in a first state, the joint energization of said signal lines and, in a second state, the absence of energization of either of said signal lines; means for registering said joint energization after a preselected period provided by a delay means; and means for automatically activating said switching means to break said signal paths in response to said binary signal in said second state after said binary signal in said first state.

2. Apparatus for coupling calls according to claim 1, further comprising timing means responsive to said first state of said call sensing means for timing the duration of said joint energization;

display means initiated after said preselected period to provide a numerical respresentation of a billing charge as determined by the duration of said joint energization; and wherein said switching activating means includes latching means, said latching means being responsive to said display means for inhibiting the remaking of said signal paths through said switching means upon the occurrence of said numerical representation and for inhibiting interruption of said signal paths in the absence of said numerical representation during said preselected period.

3. Apparatus according to claim 2, wherein said latching means is further responsive to said call sensing means through said timing means and said display means for inhibiting the interruption of the signal paths in each of said signal lines after said preselected period and during said joint energization of said signal lines.

4. Apparatus according to claim 2, wherein said jack means includes means for sensing connection of a phone plug to each of said signal lines.

5. Apparatus according to claim 4, further comprising manual switching means for providing a signal to extinguish the display of said numerical representation and to clear said timing means of accumulated information indicative of the billing charge, said manual switching means being operative only in the absence of at least one said phone plug connection so that said display and said timing means must be cleared prior to the initiation of subsequent apparatus use.

6. Apparatus according to claim 4 further comprising manual switching means for providing a signal to extinguish the display of said numerical representation and to clear said timing means of accumulated information indicative of the billing charge, said manual switching means comprising series connected relay contacts of said jack means responsive to the presence and absence of at least one said phone plug connection for clearing said timing means prior to the initiation of subsequent apparatus use.

7. Apparatus according to claim 2 wherein said jack means includes means for sensing connection of a phone plug to each of said signal lines, said apparatus additionally comprising selector means, automatic switching means and manual switching means, said selector means being operative in a first mode to activate said automatic switching means, said automatic switching means being operative to extinguish the display of said numerical representative and to clear said timing means of accumulated information indicative of the billing charge upon removal of said at least one phone jack from said at least one phone plug, said selector means being operative in a second mode to activate said manual switching means, said manual switching means being operative to extinguish the display of said numerical representation indicative of said billing charge only in the absence of at least one said phone plug connection so that said display and said timing means must be manually cleared by a separate operation prior to the initiation of subsequent apparatus use.

8. A method for coupling external calls through a telephone switchboard connecting a telephone plug to first and second signal lines comprising:

inductively coupling said first and second signal lines to one another;

independently sensing the continuity in each of the said signal lines and providing a binary signal indicating in a first state the joint energization of said signal lines and in a second state the absence of energization of either said signal lines;

sensing the duration of said joint energization;

registering said joint energization after a preselected period:

inhibiting interruption of said signal paths during joint energization interrupting said signal paths in response to the absence of energization in either of said signal lines; and inhibiting the reconnection of said signal paths until the disconnection of a telephone call from one of said signals lines.

* * * * *